Patented Jan. 2, 1945

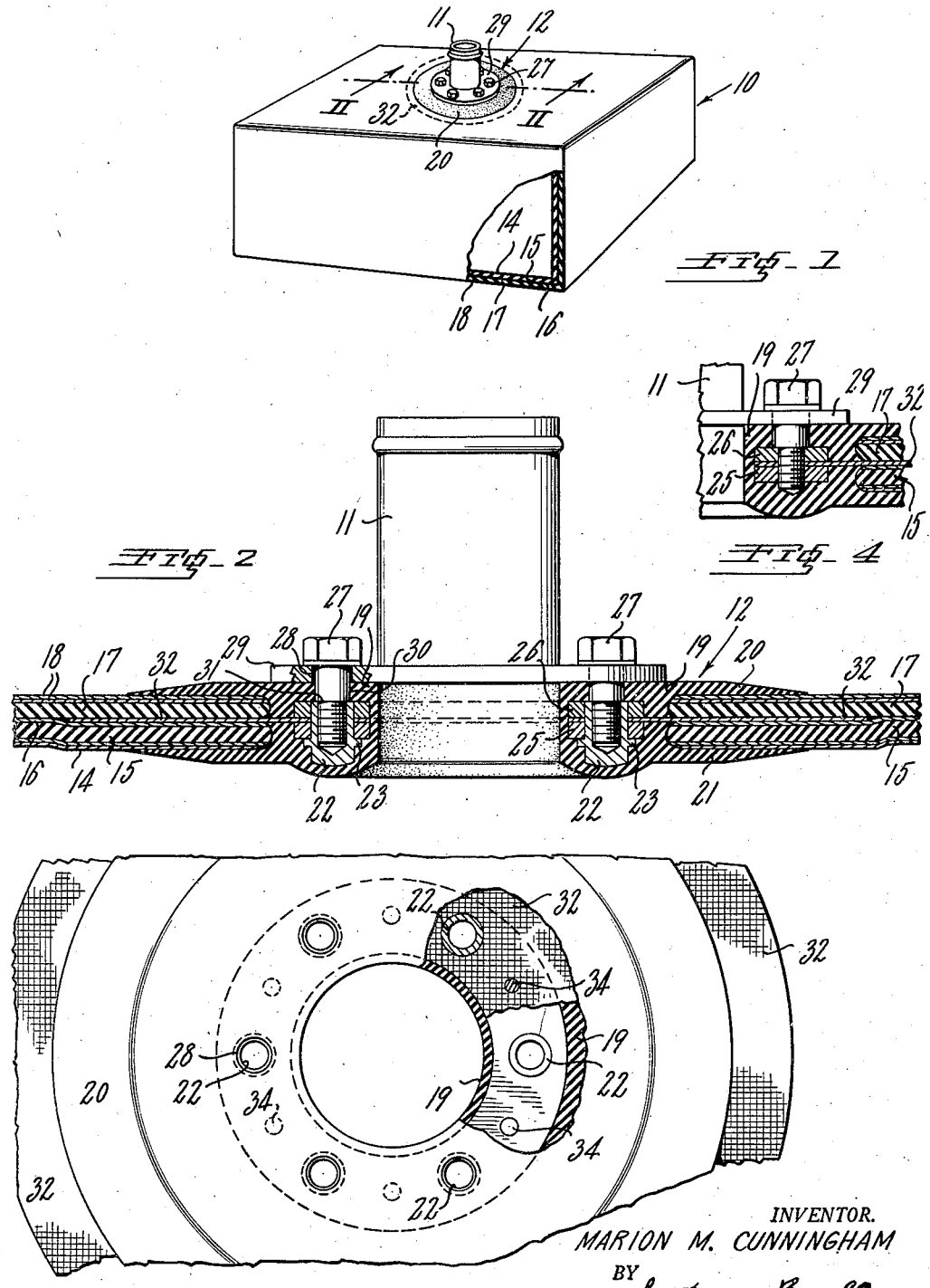

2,366,442

UNITED STATES PATENT OFFICE 2,366,442

TANK FITTING

Marion M. Cunningham, South Bend, Ind., assignor to United States Rubber Company, New York, N. Y., a corporation of New Jersey Application December 22, 1943, Serial No. 515,246

3 Claims. (Cl. 285—38)

This invention relates to tank fittings, and more particularly it relates to means for sealing outlet openings in flexible tanks. The present invention is an improvement over the structure disclosed in the Steiner Patent No. 2,326,263, issued August 10, 1943.

In the manufacture of tanks and particularly puncture sealing tanks which incorporate a plurality of flexible layers of fabric and puncture sealing material much difficulty is encountered in the manner of securing fittings to various layers at points where fittings such as filler connections are associated with the tank. In flexible tanks for use with aircraft it is necessary that the fitting should be tightly sealed; that the walls of the tanks be impervious to the fuel contained in the tanks; that the fitting shall be capable of withstanding a wide range of temperature changes without losing its strength; and that the fitting shall be simple and easy of manufacture.

To meet these requirements, I provide a tank fitting in which an annular or grommet-like body of flexible material such as natural or artificial rubber is provided with flanges which engage the tank walls with a fluid-tight joint. Within the grommet anchoring means are embedded for cooperation with screws or other anchoring means extending into the body for securing a conduit or the like to the tank for closing an opening. In order to strengthen the connection, I provide a strip or disc of flexible fabric which is secured to the anchoring means and extends radially outward between the flanges for engagement with a fabric layer in the tank wall, so that the material of the body is relieved of much of any direct pull which may occur about the opening during the utilization of the tank. This is of particular importance when the tank is subjected to extremely low temperatures where the body material of natural or artificial rubber may become frozen and brittle. Under such conditions the fabric strip serves as a direct connection between the fabric in the tank wall and the anchoring means. In order to prevent the seepage of the tank contents through the tank wall and the tank fitting the fabric layer has its inner surfaces completely embedded in the body material and its outer surfaces are separated from the tank contents by one or more of the impermeable layers of the tank wall.

In the accompanying drawing:

Fig. 1 is a broken perspective view of a tank embodying my invention;

Fig. 2 is a sectional view of the tank fitting taken along the section line II—II of Fig. 1;

Fig. 3 is a plan view, partially broken away in section, of the tank fitting; and Fig. 4 is a partial view of a modified form of the fitting.

Referring to the drawing, and particularly to Fig. 1, I show a tank in a form of a rectangularly shaped container 10, to which a conduit 11 is secured by the fitting 12. As is particularly shown in Fig. 2, the wall of the tank 10 comprises an inner or fluid engaging surface 14 comprising one or more thin layers of material which is particularly resistant to the action of the tank contents. In the case of airplane tanks, this surface can be formed of a layer of a nylon composition backed by a thin layer of Buna-N composition. These layers may be composed of different materials as desired in accordance with the duty to which the tank is to be subjected. The purpose is to prevent a direct action of the tank contents on a backing or sealing layer 15 of a rubber composition, either artificial or natural, usually in an unvulcanized condition so as to serve as a bullet sealing material. The layer 15 is backed by a layer 16 of a fabric which is usually of the cord type which extends all around the tank wall to give it mechanical strength. A second sealing layer 17 is mounted exteriorly of the layer 15 and the outer surface of the tank is illustrated as being formed of two layers of cord fabric 18 which are treated to improve their wear and tear resisting properties and give some rigidity to the tank.

The fitting 12 comprises a main body 19 of moldable composition, either natural or artificial rubber, having flanges 20 and 21 which extend outwardly from the tank opening to engage and to be united with the tank walls to form a fluid-tight joint. Embedded in the body 19 are anchoring means 22 in the form of threaded dome nuts seated in a pair of rings 25 and 26. The dome nuts 22 may be provided with shoulders 23 for engaging the ring 25 as a stop. Complementary anchoring means 27, illustrated in the form of screws, extend through openings 28 in a flange 29 on the conduit 11 and through openings 30 in the body material so as to engage threads in dome nuts 22 and clamp the conduit 11 to the tank while exerting a sealing pressure in the body material between the flange 29 and the upper ring 26. By providing shoulders 31 on the screws 27, the amount of pressure which can be exerted on the body material is limited thereby preventing excessive flow of the body material outwardly between the ring 26 and the flange 29. The rings 25 and 26 may be of any suitable metal such as steel or duraluminum where lightness is important.

If desired, as illustrated in Fig. 4, the dome nuts 22 may be dispensed with, and the screws 27 may be directly threaded into the threaded openings in the rings 25 and 26.

A layer or strip of flexible material 32 treated to render it vulcanizable, an example of which is a square woven duck, is clamped between the rings 25 and 26, which, in turn, are secured by pins 34 shown in Fig. 3. The strip 32 extends outwardly through the body material 19 intermediate the flanges 20 and 21 and is joined to the fabric layer 16 by a vulcanized bond so that stresses arising in the fabric 16 may be transmitted through the fabric 32 directly to the metal rings 25 and 26 without undue distortion of the body material 19.

The present seepage of the contents of the tank through the layer 32, the inner surfaces of the latter are entirely embedded in the body material 19 and the outer surfaces are separated from the contents of the tank by the impermeable material of layers 14 and 15, the inner end of the layer 15 being in direct engagement with the material 19 without the interposition of any fabric. Accordingly, the majority of the pulls originating in the tank walls are transmitted through the layer 32 to the rings 25 and 26 without a material distortion of the body material 19. This is of great importance where the tank is utilized under conditions of low temperature, where the material tends to freeze and become brittle and is liable to mechanical disintegration due to shock. At the same time seepage of the tank contents through the layer 32 is prevented.

While I have shown and described my invention as being for use in connection with the conduit 11, it is to be understood that the grommet construction may be used for other tank openings, such as tank outlets, hand holds, pipe connections, and the like, and therefore the invention is susceptible of those modifications which appear within the spirit of the invention and the scope of the appended claims.

Having thus described my invention, what I claim and desire to protect by Letters Patent is:

1. A tank fitting comprising an annular body of flexible material and a pair of radially extending flanges for attachment to tank wall, anchoring means disposed in said body in alignment with openings in said body for the reception of complementary anchoring means extending from a lateral surface of the body, and a fabric reinforcing strip disposed intermediate said flanges in engagement with the first-named anchoring means and with its radially inward surfaces embedded in said body to prevent transmission of fluid therethrough to the inner surfaces of said body.

2. A tank fitting comprising an annular body of flexible material and a pair of radially extending flanges for attachment to a tank wall, anchoring means disposed in said body in alignment with openings in said body for the reception of complementary anchoring means extending from a lateral surface of the body, and a flexible reinforcing strip disposed intermediate said flanges in engagement with the first-named anchoring means and with its radially inward surfaces embedded in said body to prevent transmission of fluid therethrough to the inner surfaces of said body.

3. A tank structure comprising in combination a tank wall composed of layers of fabric and sealing material and a tank fitting comprising an annular body of flexible material having a pair of flanges attached to outer surfaces of the tank wall, anchoring means disposed in said body in alignment with openings in said body for the reception of complementary anchoring means extending from a lateral surface of the body, and a flexible reinforcing strip disposed intermediate said flanges in engagement with the anchoring means and with an inner fabric layer of the tank wall and having its radially inner surfaces embedded in said body whereby said body and the inner layer of sealing material serve to isolate said reinforcing strip from the contents of the tank to prevent seepage of the tank contents therethrough, while affording a connection from the tank wall to the anchoring means.

MARION M. CUNNINGHAM.